US010395436B1

United States Patent
Li et al.

(10) Patent No.: US 10,395,436 B1
(45) Date of Patent: Aug. 27, 2019

(54) SYSTEMS AND METHODS FOR VIRTUAL APPLICATION OF MAKEUP EFFECTS WITH ADJUSTABLE ORIENTATION VIEW

(71) Applicant: Perfect Corp., New Taipei (TW)

(72) Inventors: Guo-Wei Li, Hualien (TW); Kuo-Sheng Lin, New Taipei (TW); I-Ting Shen, New Taipei (TW); Effendy Eka Saputra, New Taipei (TW)

(73) Assignee: PERFECT CORP., New Taipei (TW)

( * ) Notice: Subject to any disclaimer, the term of this patent is extended or adjusted under 35 U.S.C. 154(b) by 0 days.

(21) Appl. No.: 16/054,200

(22) Filed: Aug. 3, 2018

Related U.S. Application Data

(60) Provisional application No. 62/642,062, filed on Mar. 13, 2018.

(51) Int. Cl.
| | | |
|---|---|---|
| *G06T 19/20* | (2011.01) | |
| *G06K 9/00* | (2006.01) | |
| *G06T 7/73* | (2017.01) | |
| *A45D 44/00* | (2006.01) | |
| *G06F 3/0484* | (2013.01) | |

(52) U.S. Cl.
CPC ............ *G06T 19/20* (2013.01); *A45D 44/005* (2013.01); *G06F 3/04845* (2013.01); *G06K 9/00268* (2013.01); *G06T 7/75* (2017.01); *G06T 2207/10016* (2013.01); *G06T 2207/30201* (2013.01); *G06T 2219/2016* (2013.01)

(58) Field of Classification Search
None
See application file for complete search history.

(56) References Cited

U.S. PATENT DOCUMENTS

| | | |
|---|---|---|
| 8,908,904 B2 | 12/2014 | Santos et al. |
| 9,058,765 B1 | 6/2015 | Mallick et al. |

(Continued)

FOREIGN PATENT DOCUMENTS

| | | |
|---|---|---|
| CN | 102063738 A | 5/2011 |
| CN | 102406308 B | 7/2013 |

(Continued)

OTHER PUBLICATIONS

Anonymous, Poser Pro 2012 Professional 3D Figure Design & Animation, Jul. 31, 2012, i-iii,68,69, 251-253; retrieved from: https://my.smithmicro.com/update_files/Poser-Pro-Reference-Manual.pdf (Year: 2012).*

(Continued)

*Primary Examiner* — Robert J Craddock
(74) *Attorney, Agent, or Firm* — McClure, Qualey & Rodack, LLP

(57) ABSTRACT

A computing device records and stores a video of a user's head. The computing device retrieves a plurality of target orientation views and extracts digital images of a face of the user from the video at each of the plurality of target orientation views. The computing device displays a user interface and obtains a selection of a makeup effect. The computing device performs virtual application of the selected makeup effect onto a digital image of the user's face. The computing device obtains an orientation view and displays the user's face at the obtained orientation view with the selected makeup effect applied to the user's face.

19 Claims, 13 Drawing Sheets

(56) References Cited

U.S. PATENT DOCUMENTS

| | | |
|---|---|---|
| 9,330,298 B2 | 5/2016 | Imai |
| 2005/0135675 A1 | 6/2005 | Chen et al. |
| 2010/0231692 A1 | 9/2010 | Perlman et al. |
| 2011/0164787 A1 | 7/2011 | Legagneur et al. |
| 2011/0298929 A1 | 12/2011 | Garcia et al. |
| 2012/0044335 A1 | 2/2012 | Goto |
| 2012/0218423 A1 | 8/2012 | Smith et al. |
| 2015/0042762 A1* | 2/2015 | Kim .................. G06T 19/20 348/47 |
| 2016/0042557 A1 | 2/2016 | Lin et al. |
| 2016/0128450 A1 | 5/2016 | Saito et al. |
| 2016/0224825 A1* | 8/2016 | Tomita ............... G06K 9/00268 |
| 2016/0357578 A1 | 12/2016 | Kim et al. |

FOREIGN PATENT DOCUMENTS

| | | |
|---|---|---|
| CN | 105760836 A | 7/2016 |
| CN | 104122264 B | 8/2016 |
| CN | 106548156 A | 3/2017 |
| JP | 2011008397 A | 1/2011 |
| JP | 2011228936 A | 11/2011 |
| KR | 101748371 B1 | 6/2017 |
| WO | 2015/052706 A1 | 4/2015 |
| WO | 2017148959 A1 | 9/2017 |

OTHER PUBLICATIONS

"Rimmel Get the Look" 5 Beauty Apps to Save you Time and Money, https://frugalginger.com/2016/10/5-beauty-apps-save-time-money/. Oct. 31, 2016.

King, Leo. "Stunning Augmented Reality App Lets You Virtually Apply Makeup" https://www.forbes.com/sites/leoking/2015/07/30/new-makeup-augmented-reality-modiface-yves-rocher-jane-iredale/#40aba47b62e8. Jul. 30, 2015.

Reddy, Trips. "L'Oreal Makeup Genius App" 14 Brands Using Mobile Apps Instead of Ads to Build Customer Loyalty. https://www.umbel.com/blog/marketing/14-brands-using-mobile-apps-instead-ads-build-loyalty/ Jul. 30, 2015.

Marta Podeszwa and Katie Baron, "Virtual Mobile Retail: Face AR Beauty App" http://www.stylus.com/xdksnb. Feb. 24, 2015.

Iwabuchi et al. "Smart Makeup Mirror: Computer-Augmented Mirror to Aid Makeup Application" Part of the Lecture Votes in Computer Science book series (LNCS, vol. 5613), 2009.

European Search Report dated May 20, 2019, issued in application No. 18202871.2.

\* cited by examiner

SYSTEMS AND METHODS FOR VIRTUAL APPLICATION OF MAKEUP EFFECTS WITH ADJUSTABLE ORIENTATION VIEW

CROSS-REFERENCE TO RELATED APPLICATION

This application claims priority to, and the benefit of, U.S. Provisional Patent Application entitled, "Method to view makeup effect on faces under different angles," having Ser. No. 62/642,062, filed on Mar. 13, 2018, which is incorporated by reference in its entirety.

TECHNICAL FIELD

The present disclosure generally relates to media editing and more particularly, to systems and methods for performing virtual application of makeup effects with an adjustable orientation view.

BACKGROUND

With the proliferation of smartphones, tablets, and other display devices, people have the ability to view and edit digital content virtually any time where application programs have become popular on smartphones and other portable display devices for editing and viewing media content. There is a need for an improved system and method for allowing users to view the virtual application of makeup effects.

SUMMARY

In accordance with one embodiment, a computing device records and stores a video of a user's head. The computing device retrieves a plurality of target orientation views and extracts digital images of a face of the user from the video at each of the plurality of target orientation views. The computing device displays a user interface and obtains a selection of a makeup effect. The computing device performs virtual application of the selected makeup effect onto a digital image of the user's face. The computing device obtains an orientation view and displays the user's face at the obtained orientation view with the selected makeup effect applied to the user's face.

Another embodiment is a system that comprises a memory storing instructions and a processor coupled to the memory. The processor is configured by the instructions to record and store a video of a user's head. The processor is further configured to retrieve a plurality of target orientation views and extract digital images of a face of the user from the video at each of the plurality of target orientation views. The processor is further configured to display a user interface and obtain a selection of a makeup effect. The processor is further configured to perform virtual application of the selected makeup effect onto a digital image of the user's face. The processor is further configured to obtain an orientation view and display the user's face at the obtained orientation view with the selected makeup effect applied to the user's face.

Another embodiment is a non-transitory computer-readable storage medium storing instructions to be implemented by a computing device having a processor, wherein the instructions, when executed by the processor, cause the computing device to record and store a video of a user's head. The processor is further configured to retrieve a plurality of target orientation views and extract digital images of a face of the user from the video at each of the plurality of target orientation views. The processor is further configured to display a user interface and obtain a selection of a makeup effect. The processor is further configured to perform virtual application of the selected makeup effect onto a digital image of the user's face. The processor is further configured to obtain an orientation view and display the user's face at the obtained orientation view with the selected makeup effect applied to the user's face.

In accordance with another embodiment, a computing device records and stores at least one image of a user's head, wherein the at least one image depicts the user's head at one or more angles. The computing device converts the at least one image into a three-dimensional (3D) model utilizing 3D facial reconstruction and displays a user interface and obtains a selection of a makeup effect. The computing device performs virtual application of the selected makeup effect onto a facial region of the 3D model. The computing device obtains an orientation view and displays the user's face at the obtained orientation view with the selected makeup effect applied to the user's face.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for performing virtual application of makeup effects with an adjustable orientation view, thereby providing the user with an enhanced experience. Although augmented reality systems exist that superimpose graphics on an object such as a user's face, it can be difficult to view the composite image when the user's head is turned to the side. Therefore, there is a need for an improved system and method for allowing users to view the virtual application of makeup effects.

Figure 1:
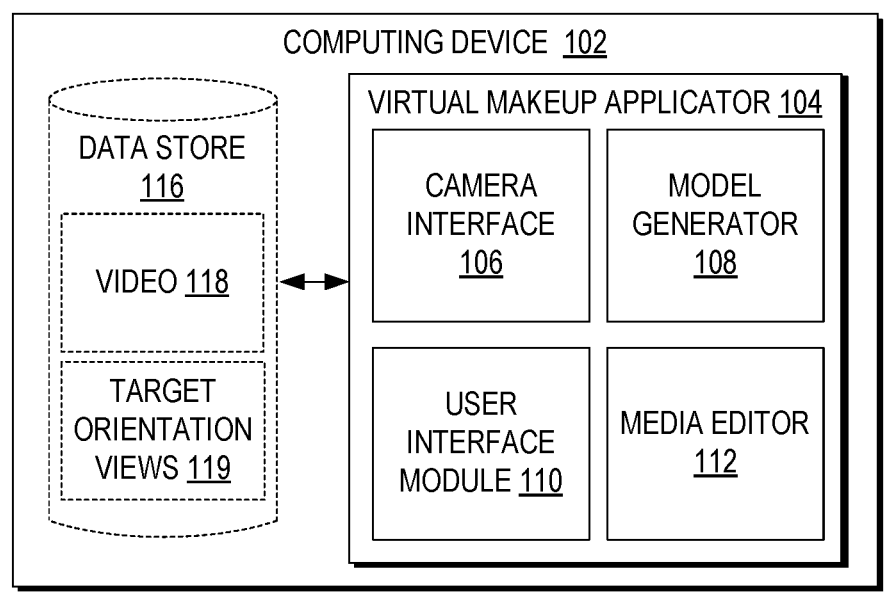
FIG. 1 is a block diagram of a computing device for performing virtual application of makeup effects with an adjustable orientation view in accordance with various embodiments of the present disclosure.

A description of a system for performing virtual application of makeup effects is now described followed by a discussion of the operation of the components within the system. FIG. 1 is a block diagram of a computing device 102 in which the improved virtual makeup application platform disclosed herein may be implemented. The computing device 102 may be embodied as a computing device such as, but not limited to, a smartphone, a tablet computing device, a laptop, and so on.

A virtual makeup applicator 104 executes on a processor of the computing device 102 and includes a camera interface 106, a model generator 108, a user interface module 110, and a media editor 112. The camera interface 106 is configured to record and store a video of a user's head, where an integrated front facing camera of the computing device 102 or a digital camera coupled to the computing device 102 may be utilized to record the video. As one of ordinary skill will appreciate, the video captured by the camera interface 106 may be encoded in any of a number of formats including, but not limited to Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The model generator 108 is configured to retrieve the video 118 and a plurality of target orientation views 119 from a data store 116. The model generator 108 then extracts digital images of the user's face from the video 118 at each of the plurality of target orientation views 119. The user interface module 110 is configured to display a user interface and obtain a selection of a makeup effect. The media editor 112 is configured to perform virtual application of the selected makeup effect onto a digital image of the user's face. The user interface module 110 also obtains an orientation view and displays the user's face at the obtained orientation view with the selected makeup effect applied to the user's face.

Figure 2:
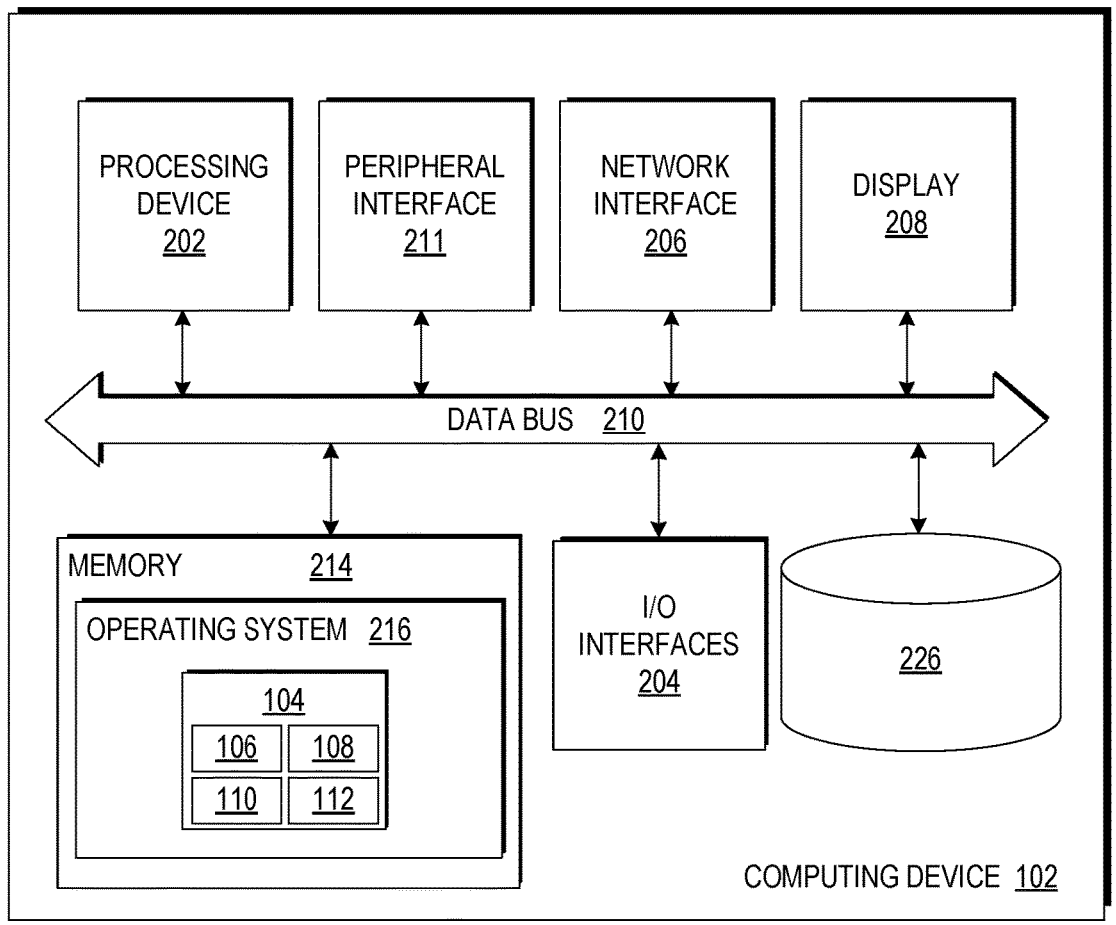
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions for implementing the pin mechanism features disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
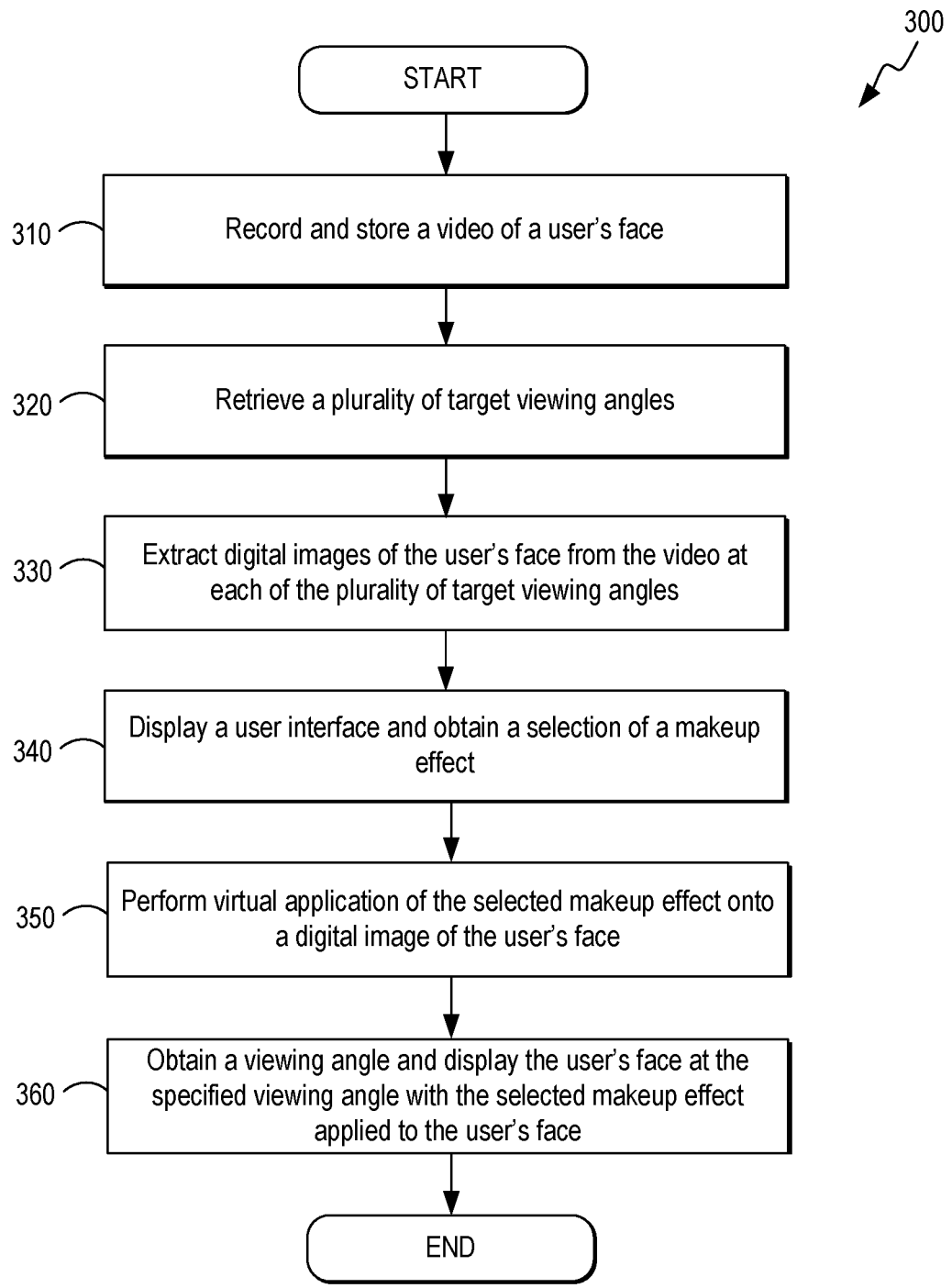
FIG. 3 is a top-level flowchart illustrating examples of functionality implemented as portions of the computing device of FIG. 1 for virtual application of makeup effects with an adjustable orientation view according to various embodiments of the present disclosure.

Reference is made to FIG. 3, which is a flowchart 300 in accordance with various embodiments for implementing virtual application of makeup effects with an adjustable orientation view performed by the computing device 102 of FIG. 1. It is understood that the flowchart 300 of FIG. 3 merely provides an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 records and stores a video of a user's face. While recording the video, the computing device 102 may be configured to display messages to the user to prompt the user to turn the user's head to different orientation views. For example, the computing device 102 may be configured to prompt the user to turn the user's head side to side and to nod up and down during the recording process. The computing device 102 may also prompt the user to blink or to close the user's eyes during the recording process. Images of the user's eyes being closed may be useful, for example, for illustrating virtual application of eye shadow later on. For some embodiments, the computing device 102 may be configured to automatically stop the recording process once the requisite orientation views have been recorded. In other embodiments, the user can manually stop the recording process.

In block 320, the computing device 102 retrieves a plurality of target orientation views 119. In block 330, the computing device 102 extracts digital images of the user's face from the video at each of the plurality of target orientation views 119. In block 340, the computing device 102 displays a user interface and obtains a selection of a makeup effect. In block 350, the computing device performs virtual application of the selected makeup effect onto a digital image of the user's face. In block 360, the computing device 102 obtains an orientation view and displays the user's face at the obtained orientation view with the selected makeup effect applied to the user's face.

For some embodiments, the computing device 102 obtains the orientation view by displaying a plurality of interface controls in the user interface, where each of the interface controls is configured to control an orientation of the user's head. For such embodiments, a first interface control is configured to adjust a yaw rotation of the user's head, and a second interface control is configured to adjust a pitch rotation of the user's head. The user interface may include a third interface control for adjusting the roll rotation of the user's head. For some embodiments, the user interface may include a fourth interface control for reverting the user's head to a default position, where the default position comprises the user's head being oriented according to a zero yaw rotation, a zero pitch rotation, and a zero roll rotation. Thereafter, the process in FIG. 3 ends.

Figure 4:
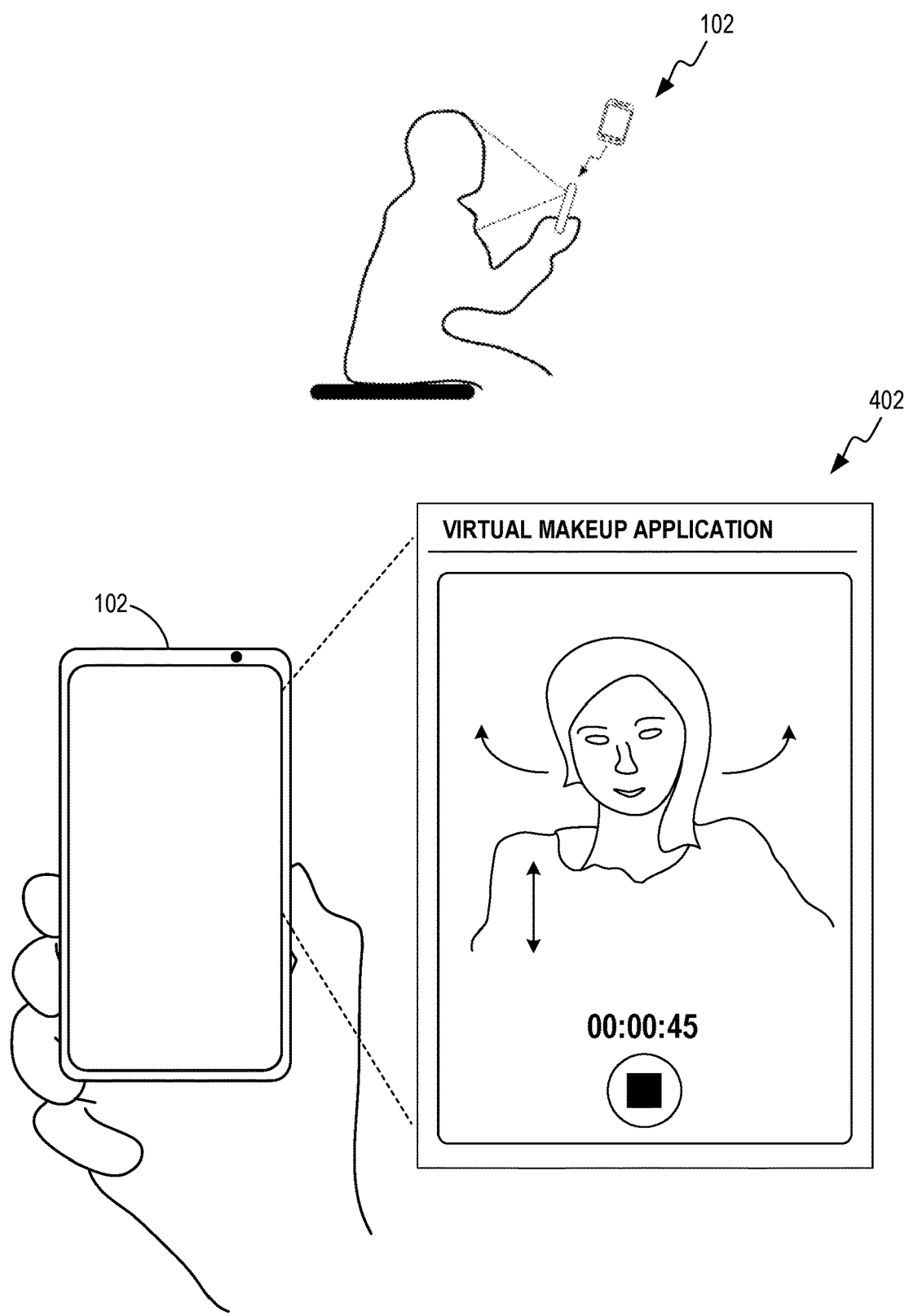
FIG. 4 illustrates an example user interface provided on a display of the computing device in FIG. 1 whereby a digital image of a user is shown in the user interface according to various embodiments of the present disclosure.
Figure 5:
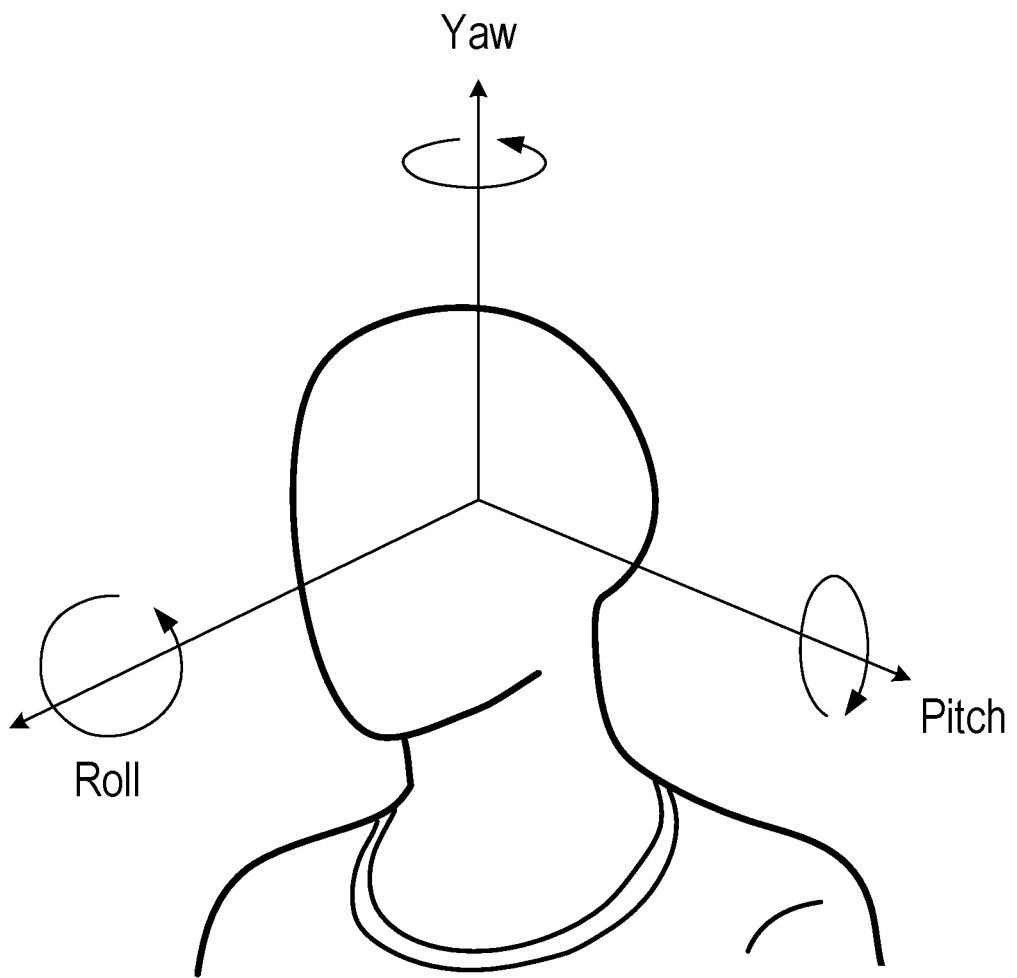
FIG. 5 illustrates how the user's head may be oriented according to different pitch, roll, and yaw rotations according to various embodiments of the present disclosure.

Having described the basic framework of a system for implementing virtual application of makeup effects with an adjustable orientation view, reference is made to the following figures, which illustrate various features according to various embodiments. FIG. 4 illustrates an example user interface 402 provided on a display of the computing device 102 whereby a digital image of a user is shown in the user interface 402. For some embodiments, the user can initiate the recording process. While the computing device 102 records a video of the user's head, the computing device 102 may display messages to prompt the user to orient the user's head according to different orientation views. FIG. 5 illustrates how the user's head may be oriented according to different pitch, roll, and yaw rotations. The user also can try different makeup effects while the user's face is displayed at the current orientation view.

Figure 6:
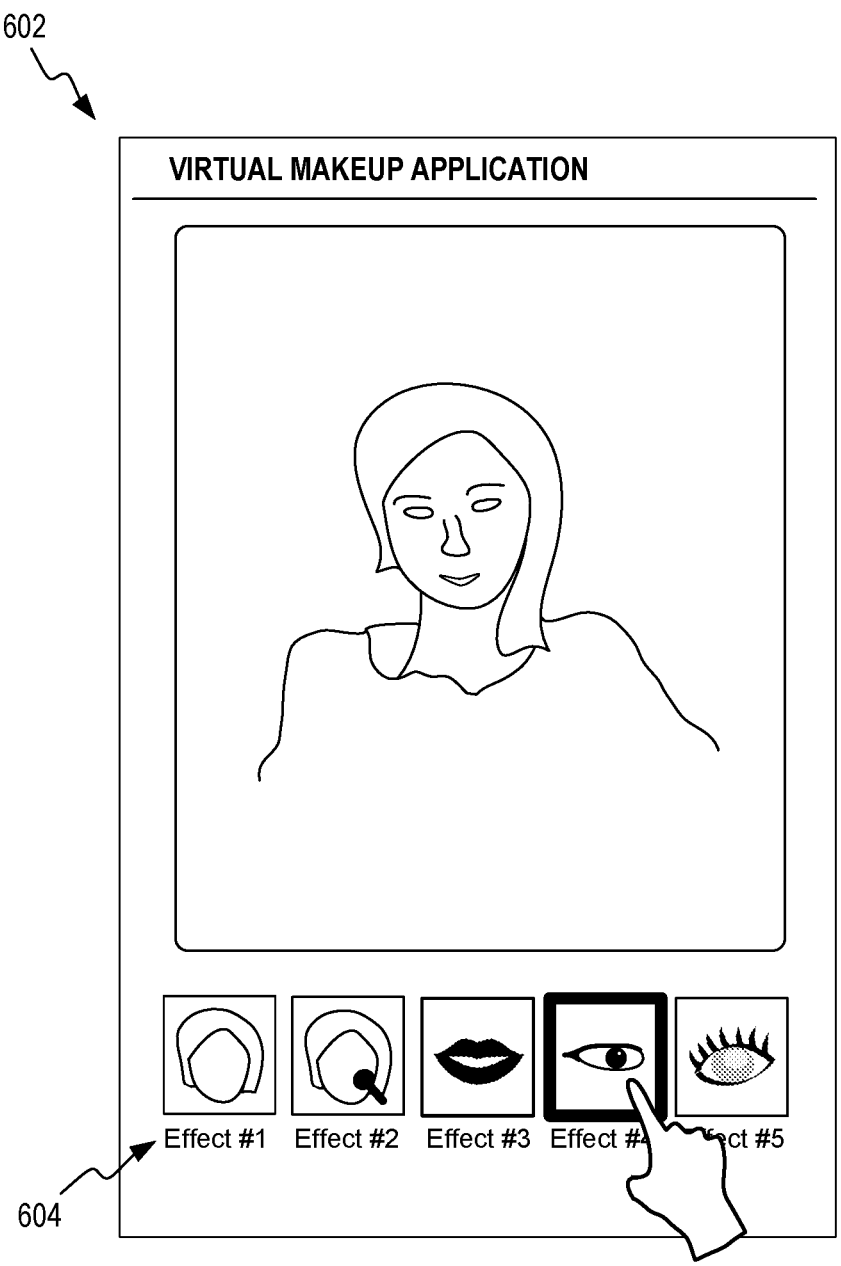
FIG. 6 illustrates an example user interface provided on a display of the computing device in FIG. 1 whereby selectable makeup effects are displayed according to various embodiments of the present disclosure.

FIG. 6 illustrates an example user interface 602 provided on a display of the computing device 102 in FIG. 1 whereby selectable makeup effects 604 are displayed. The user can select one or more of the makeup effects 604. The media editor 112 (FIG. 1) in the computing device 102 then performs virtual application of the selected makeup effects 604.

Figure 7:
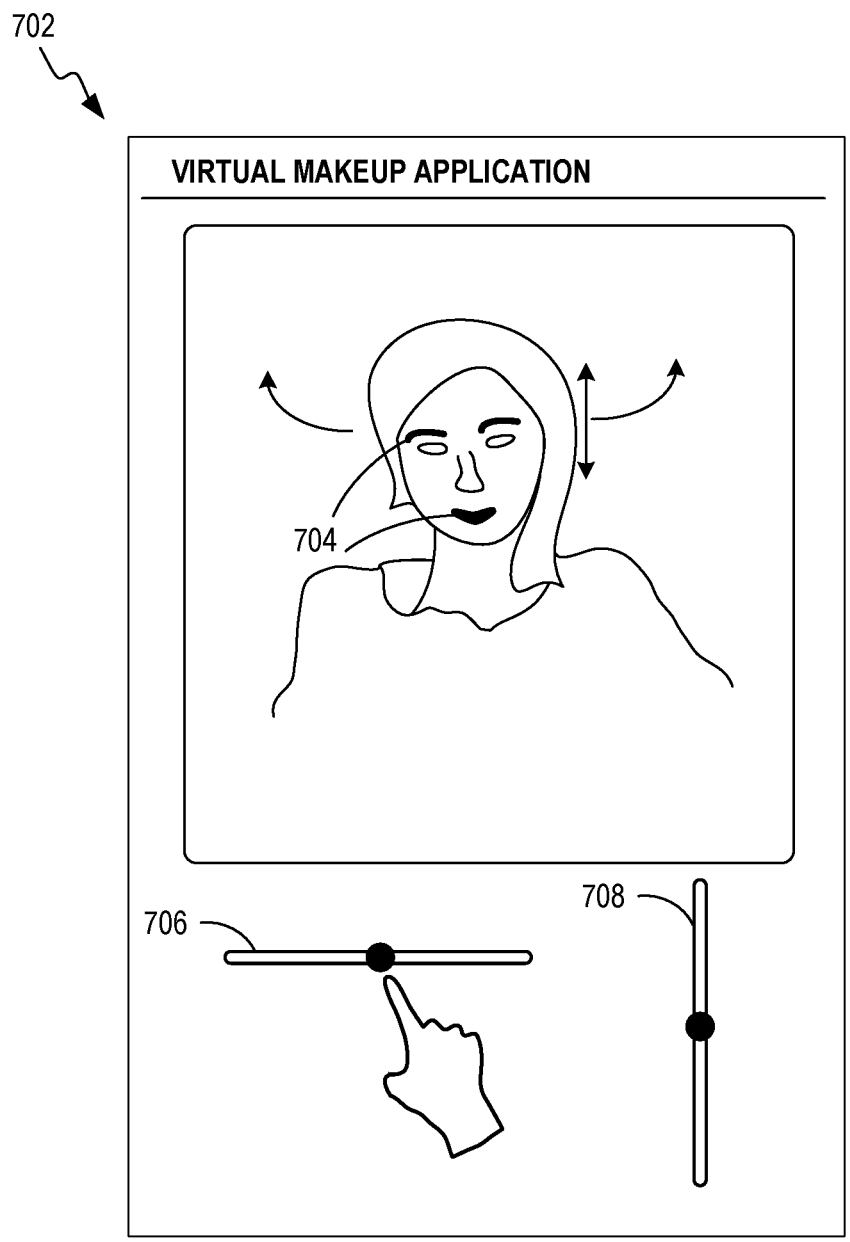
FIG. 7 illustrates an example user interface provided on a display of the computing device in FIG. 1 whereby the user can utilize user interface controls to change the orientation of the user's head according to various embodiments of the present disclosure.

FIG. 7 illustrates an example user interface 702 provided on a display of the computing device 102 in FIG. 1 whereby the user can utilize user interface controls to change the orientation of the user's head. As shown, the user interface 702 displays an image of the user's head with the selected makeup effects 704 applied to the facial region of the user. The user can utilize a first user interface control 706 to adjust the yaw rotation of the user's head and a second user interface control 708 to adjust the pitch rotation of the user's head.

Figure 8:
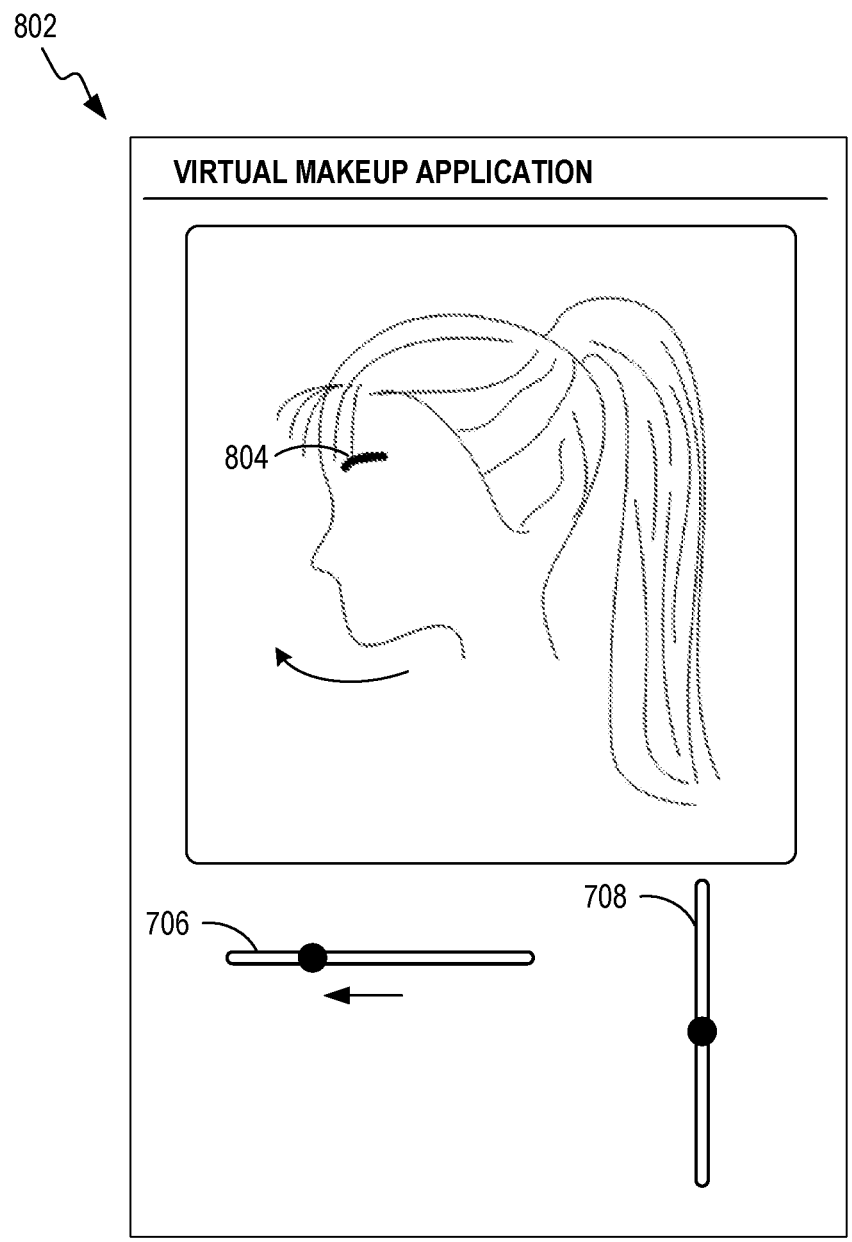
FIG. 8 illustrates an example user interface provided on a display of the computing device in FIG. 1 whereby the orientation of the user's head is adjusted based on the adjustment made by the user using the user interface controls according to various embodiments of the present disclosure.

FIG. 8 illustrates an example user interface 802 provided on a display of the computing device 102 in FIG. 1 whereby the orientation of the user's head is automatically adjusted based on the adjustment made by the user using the user interface controls 706, 708. In the example shown, the yaw rotation of the user's head is oriented such that a side profile of the user's head is shown. Note that virtual application of the selected makeup effect 804 is also shown.

Figure 9:
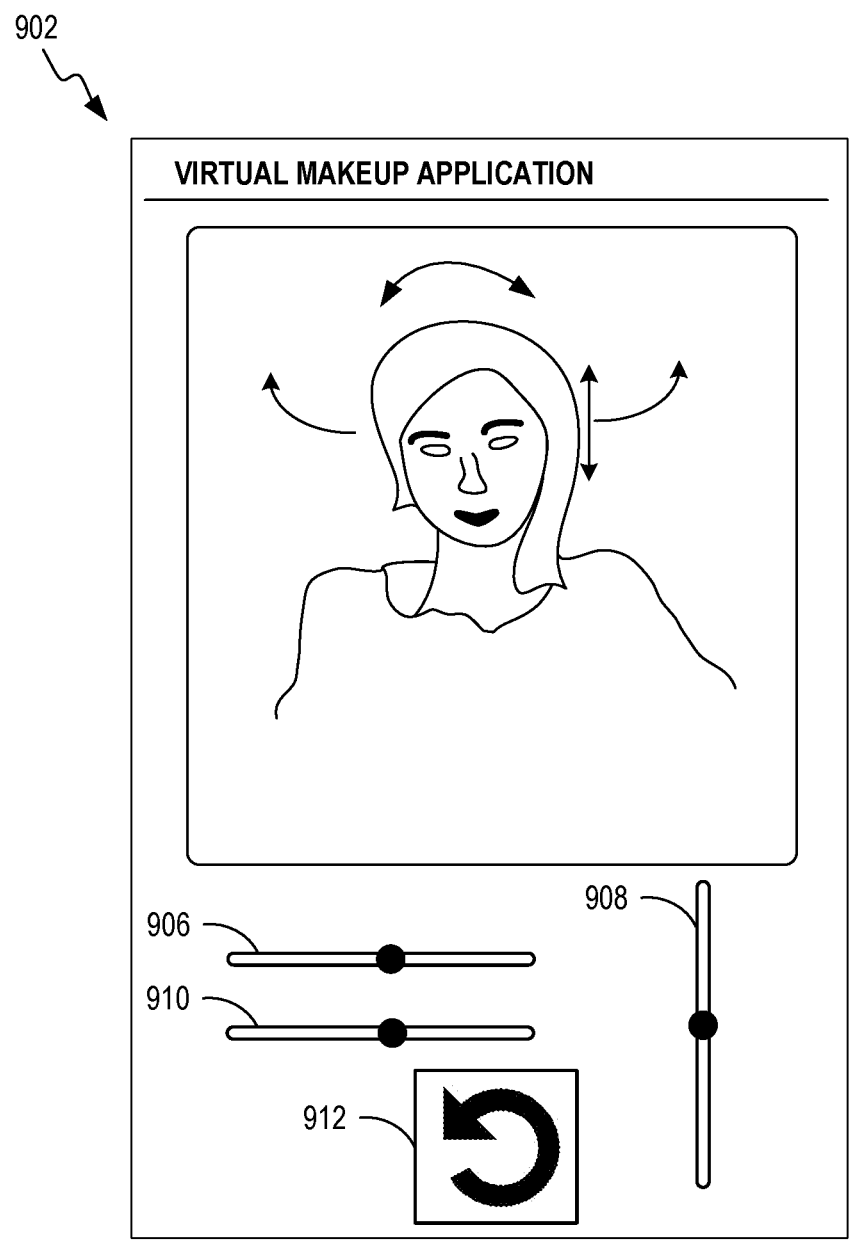
FIG. 9 illustrates another example user interface provided on a display of the computing device in FIG. 1 whereby the user can utilize user interface controls to change the orientation of the user's head according to various embodiments of the present disclosure.

FIG. 9 illustrates another example user interface 902 provided on a display of the computing device 102 in FIG. 1 whereby the user can utilize user interface controls to change the orientation of the user's head. In the example shown, a first user interface control 906 is utilized to control the yaw rotation of the user's head, a second user interface control 908 is utilized to control the pitch rotation of the user's head, and a third user interface control 910 is utilized to control the roll rotation of the user's head. A fourth user interface control 912 is utilized to revert the user's head to a default position.

Figure 10:
FIG. 10 illustrates another example user interface provided on a display of the computing device in FIG. 1 whereby the user can utilize gestures on a touchscreen to change the orientation of the user's head.

FIG. 10 illustrates another example user interface 1002 provided on a display of the computing device 102 in FIG. 1 whereby the user can utilize gestures on a touchscreen to change the orientation of the user's head. For such embodiments, the user performs one or more gestures (e.g., swipe or drag gesture) on the touchscreen of the computing device 102 to adjust the yaw rotation, the pitch rotation, and the roll rotation. As shown, the user interface 1002 may include a user interface control 1004 that allows the user to revert the user's head depicted in the user interface 1002 to a default position.

Figure 11:
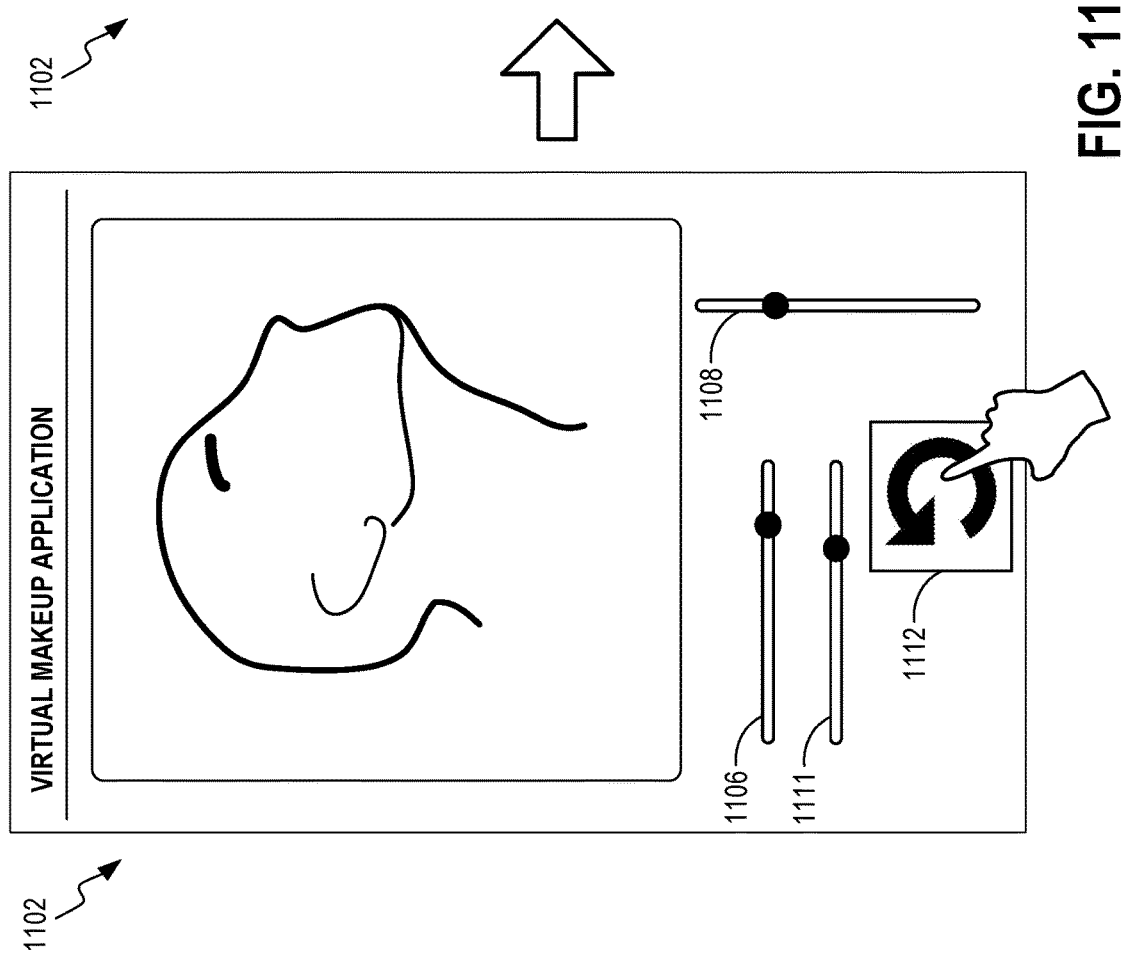
FIG. 11 illustrates use of a user interface control to revert the orientation of the user's head to a default position according to various embodiments of the present disclosure.

FIG. 11 illustrates use of a user interface control 1112 to revert the orientation of the user's head to a default position. As shown in the user interface 1102 in FIG. 11, the default position may correspond to the user's head being oriented according to a zero yaw rotation, a zero pitch rotation, and a zero roll rotation. The settings of the various user interface controls 1106, 1108, 1111 are also reset accordingly.

Figure 12:
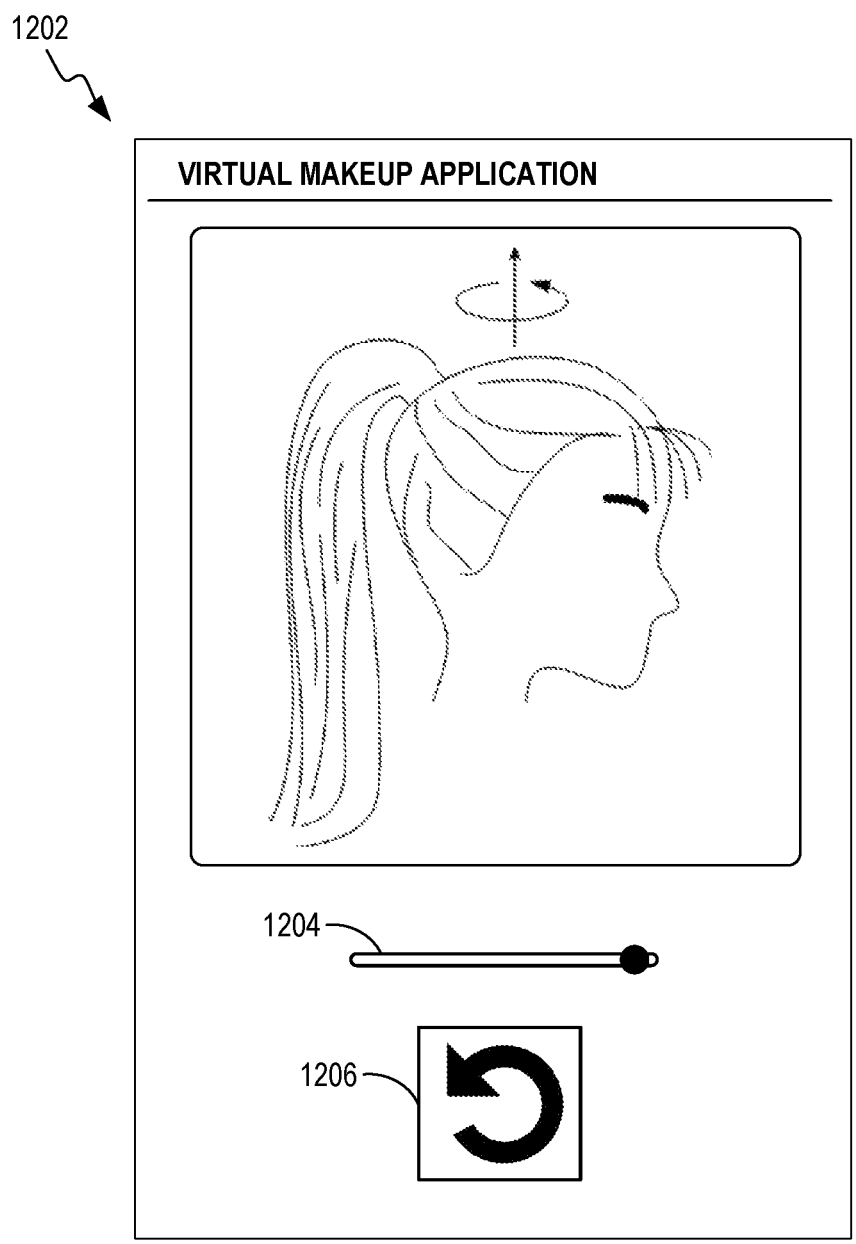
FIG. 12 illustrates another example user interface provided on a display of the computing device in FIG. 1 whereby the user utilizes a single user interface control to change the yaw rotation of the user's head.

FIG. 12 illustrates another example user interface 1202 provided on a display of the computing device 102 in FIG. 1 whereby the user utilizes a single user interface control to change the yaw rotation of the user's head. For some embodiments, the user is restricted to only changing the yaw rotation of the user's head. The user may change the yaw rotation using a first user interface control 1204 as shown in FIG. 12. Alternatively, the user may adjust the yaw rotation using a gesture performed on a touchscreen of the computing device 102. In such embodiments, any gesture (e.g., swipe or drag gesture) will only cause the yaw rotation to be adjusted. As shown, the user interface 1202 may include a second user interface control 1206 that allows the user to revert the user's head depicted in the user interface 1202 to a default position.

Figure 13:
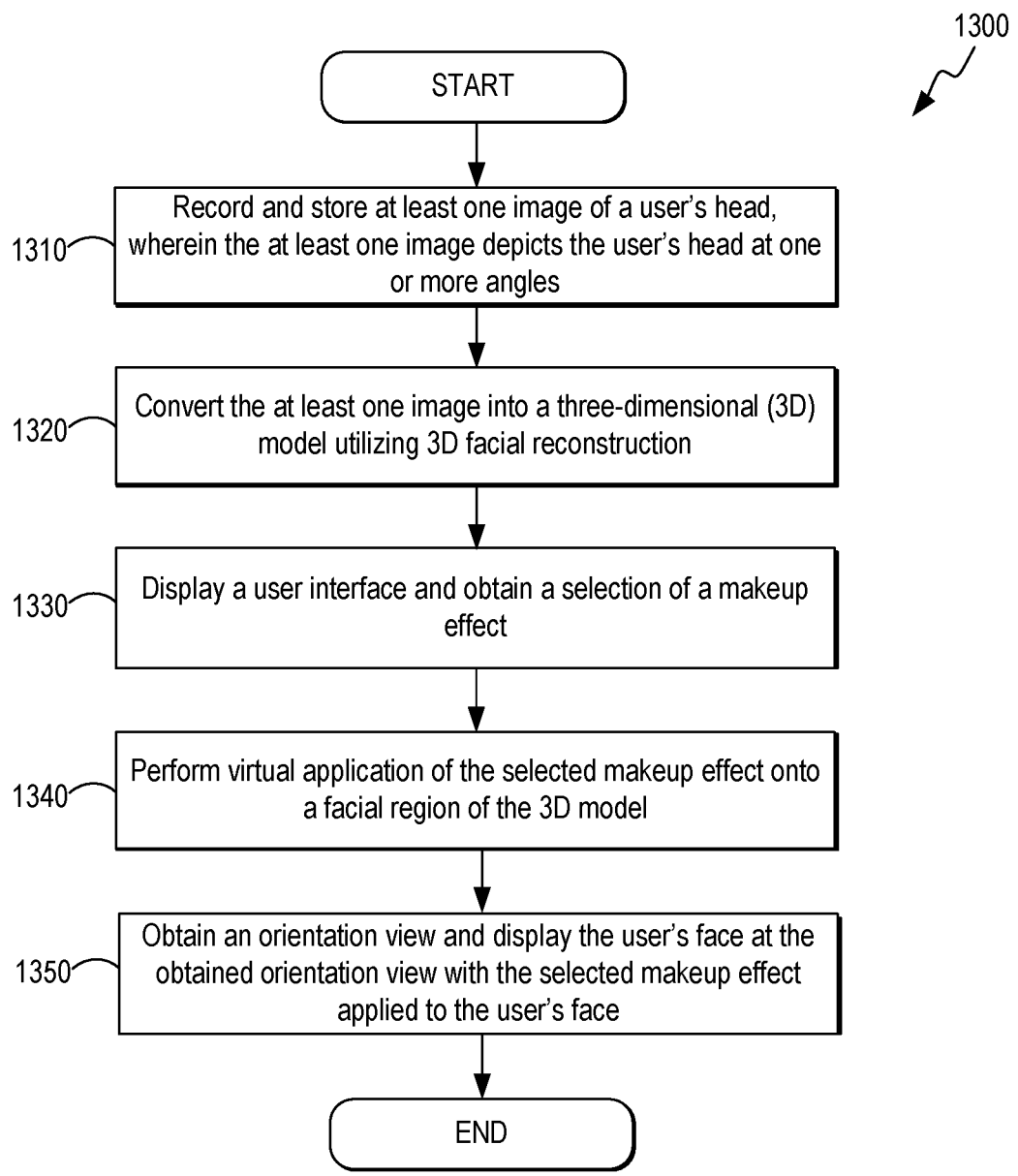
FIG. 13 is a top-level flowchart illustrating examples of functionality implemented as portions of the computing device of FIG. 1 for virtual application of makeup effects with an adjustable orientation view according to an alternative embodiment of the present disclosure.

FIG. 13 is a top-level flowchart illustrating examples of functionality implemented as portions of the computing device of FIG. 1 for virtual application of makeup effects with an adjustable orientation view according to an alternative embodiment of the present disclosure. It is understood that the flowchart 1300 of FIG. 13 merely provides an example of the different types of functional arrangements that may be employed to implement the operation of the various components of the computing device 102. As an alternative, the flowchart 1300 of FIG. 13 may be viewed as depicting an example of steps of a method implemented in the computing device 102 according to one or more embodiments.

Although the flowchart 1300 of FIG. 13 shows a specific order of execution, it is understood that the order of execution may differ from that which is depicted. For example, the order of execution of two or more blocks may be scrambled relative to the order shown. Also, two or more blocks shown in succession in FIG. 13 may be executed concurrently or with partial concurrence. It is understood that all such variations are within the scope of the present disclosure.

At block 1310, the computing device 102 records and stores at least one image of a user's head, wherein the at least one image depicts the user's head at one or more angles. At block 1320, the computing device 102 converts the at least one image into a three-dimensional (3D) model utilizing 3D facial reconstruction. At block 1330, the computing device 102 displays a user interface and obtains a selection of a makeup effect. At block 1340, the computing device 102 performs virtual application of the selected makeup effect onto a facial region of the 3D model. At block 1350, the computing device 102 obtains an orientation view and displays the user's face at the obtained orientation view with the selected makeup effect applied to the user's face. Thereafter, the process in FIG. 13 ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device, comprising:
   recording and storing a video of a user's head;
   retrieving a plurality of target orientation views;
   extracting digital images of a face of the user from the video at each of the plurality of target orientation views;
   displaying a user interface and obtaining a selection of a makeup effect;
   performing virtual application of the selected makeup effect onto a digital image of the user's face;
   obtaining an orientation view and displaying the user's face at the obtained orientation view with the selected makeup effect applied to the user's face; and
   displaying prompts to direct the user to orient the user's head at different angles while recording the video.

2. The method of claim 1, wherein obtaining the orientation view comprises displaying a plurality of interface controls in the user interface, each of the interface controls being configured to control an orientation of the user's head.

3. The method of claim 2, wherein a first interface control is configured to adjust a yaw rotation of the user's head.

4. The method of claim 3, wherein a second interface control is configured to adjust a roll rotation of the user's head, and wherein a third interface control is configured to adjust a pitch rotation of the user's head.

5. The method of claim 4, wherein a fourth interface control is configured to revert the orientation of the user's head to a default position.

6. The method of claim 5, wherein the default position comprises the user's head being oriented according to a zero yaw rotation, a zero pitch rotation, and a zero roll rotation.

7. A system, comprising:
   a memory storing instructions;
   a processor coupled to the memory and configured by the instructions to at least:
   record and store a video of a user's head;
   retrieve a plurality of target orientation views;
   extract digital images of a face of the user from the video at each of the plurality of target orientation views;
   display a user interface and obtain a selection of a makeup effect;
   perform virtual application of the selected makeup effect onto a digital image of the user's face;
   obtain an orientation view and display the user's face at the obtained orientation view with the selected makeup effect applied to the user's face; and
   display prompts to direct the user to orient the user's head at different angles while recording the video.

8. The system of claim 7, wherein the processor obtains the orientation view by displaying a plurality of interface controls in the user interface, each of the interface controls being configured to control an orientation of the user's head.

9. The system of claim 8, wherein a first interface control is configured to adjust a yaw rotation of the user's head.

10. The system of claim 9, wherein a second interface control is configured to adjust a roll rotation of the user's head, and wherein a third interface control is configured to adjust a pitch rotation of the user's head.

11. The system of claim 10, wherein a fourth interface control is configured to revert the orientation of the user's head to a default position.

12. The system of claim 11, wherein the default position comprises the user's head being oriented according to a zero yaw rotation, a zero pitch rotation, and a zero roll rotation.

13. A non-transitory computer-readable storage medium storing instructions to be implemented by a computing device having a processor, wherein the instructions, when executed by the processor, cause the computing device to at least:
  record and store a video of a user's head;
  retrieve a plurality of target orientation views;
  extract digital images of a face of the user from the video at each of the plurality of target orientation views;
  display a user interface and obtain a selection of a makeup effect;
  perform virtual application of the selected makeup effect onto a digital image of the user's face;
  obtain an orientation view and display the user's face at the obtained orientation view with the selected makeup effect applied to the user's face; and
  display prompts to direct the user to orient the user's head at different angles while recording the video.

14. The non-transitory computer-readable storage medium of claim 13, wherein the processor obtains the orientation view by displaying a plurality of interface controls in the user interface, each of the interface controls being configured to control an orientation of the user's head.

15. The non-transitory computer-readable storage medium of claim 14, wherein a first interface control is configured to adjust a yaw rotation of the user's head, wherein a second interface control is configured to adjust a roll rotation of the user's head, and wherein a third interface control is configured to adjust a pitch rotation of the user's head.

16. The non-transitory computer-readable storage medium of claim 15, wherein a third interface control is configured to adjust a roll rotation of the user's head.

17. The non-transitory computer-readable storage medium of claim 16, wherein a fourth interface control is configured to revert the orientation of the user's head to a default position.

18. The non-transitory computer-readable storage medium of claim 17, wherein the default position comprises the user's head being oriented according to a zero yaw rotation, a zero pitch rotation, and a zero roll rotation.

19. A method implemented in a computing device, comprising:
  recording and storing at least one image of a user's head, wherein the at least one image depicts a face of the user at one or more angles;
  converting the at least one image into a three-dimensional (3D) model utilizing 3D facial reconstruction;
  displaying a user interface and obtaining a selection of a makeup effect;
  performing virtual application of the selected makeup effect onto a facial region of the 3D model;
  obtaining an orientation view and displaying the user's face at the obtained orientation view with the selected makeup effect applied to the user's face; and
  displaying prompts to direct the user to orient the user's head at different angles while recording the video.

* * * * *